United States Patent Office 2,772,963
Patented Dec. 4, 1956

2,772,963

INERT-GAS SHIELDED-ARC WELDING OF 90-10 TYPE COPPER-NICKEL MATERIAL

George Raymond Pease, Westfield, and Theodore Ephraim Kihlgren, Berkeley Heights, N. J., assignors to The International Nickel Company, Inc., New York, N. Y., a corporation of Delaware No Drawing. Application November 6, 1953,
Serial No. 390,733

15 Claims. (Cl. 75—159)

The present invention relates to the arc welding of metal and especially to a welding electrode or welding rod and an inert gas-shielded arc-welding process for producing substantially pore-free, sound, strong, and ductile weld deposits and more particularly to a copper-nickel arc-welding electrode or welding rod adapted for producing such weld deposits on iron-bearing copper-nickel material and also to the resultant weld deposit and welded product.

Copper-nickel alloy of the 90 (copper)-10 (nickel) type containing about 5% to 15% nickel and approximately 1 to 1.5% iron is a relatively new material. The prior art relative to joining this material is therefore very limited. While attempts have been made to weld this material using a 70% copper-30% nickel alloy, no electrode of substantially matched composition has been available for satisfactorily welding the aforementioned iron-bearing 90-10 type copper-nickel alloy. The recent critical shortage of nickel served to focus attention on this relatively new alloy as a substitute for 70/30 copper-nickel alloy in the shipbuilding induhtry. This prompted efforts to produce an electrode of a composition similar to or matching that of the iron-bearing 90-10 type copper-nickel material to be joined. It has been proposed to weld iron-bearing 90-10 type copper-nickel material with a consumable electrode or welding rod of the nominal composition 10% nickel, 1.5% iron, 0.50% manganese, and the balance copper, but it has not been possible to consistently produce welds free from porosity with such a welding rod or electrode when welding with either the non-consumable tungsten arc electrode or the consumable electrode variation of the inert gas-shielded arc-welding process. Nor do such welds possess strength properties of the desired magnitude. Although many attempts were made to overcome the foregoing difficulties and other difficulties, none, as far as we are aware, was entirely successful when carried into practice commercially on an industrial scale.

It has now been discovered that by the use of a special 90-10 type copper-nickel consumable electrode or welding rod in an inert gas-shielded arc-welding process welds are readily obtained that are virtually porosity-free and that have attractive strength properties and ductility.

It is an object of the present invention to provide a 90-10 type copper-nickel consumable electrode or welding rod capable of producing sound, strong, and ductile welds which are substantially free from porosity.

Another object of the invention is to provide a 90-10 type copper-nickel consumable electrode or welding rod capable of producing sound, strong, and ductile welds on iron-bearing 90-10 type coper-nickel alloy material.

The invention also contemplates providing a copper-nickel consumable electrode or welding rod for use in both the consumable electrode and the non-consumable electrode variations of the inert gas-shielded arc-welding process.

It is a further object of the invention to provide a 90-10 type copper-nickel consumable electrode or welding rod for use in both the consumable electrode and the non-consumable electrode variations of the inert gas-shielded arc-welding process using argon or helium as the shielding gas.

The invention further contemplates providing a method for joining 90-10 type copper-nickel material using the inert gas-shielded consumable electrode arc-welding process.

It is another object of the invention to provide a method for joining 90-10 type copper-nickel material using the inert gas-shielded non-consumable electrode arc-welding process.

Still another object of the invention is to provide a method for joining copper-nickel material using either the consumable electrode or the non-consumable electrode variation of the inert gas-shielded arc-welding process.

It is also an object of the invention to provide a cupro-nickel weld deposit which is sound, strong, ductile, and susbtantially free from porosity.

It is also the purpose of the invention to provide an article of manufacture having a welded joint in cupro-nickel composition, the weld being sound, strong, ductile, and substantially free from porosity.

Other objects and advantages of the invention will become apparent from the following description.

Broadly stated, the present invention contemplates a special consumable electrode or welding rod particularly adapted for the inert gas-shielded electric-arc welding of copper-nickel alloys in which the electrode or welding rod is a 90-10 type copper-nickel alloy with the amounts of the essential ingredients controlled within critical ranges as set forth hereinbelow. The electrode composition provided by the present invention is a copper-base alloy containing as the essential ingredients copper, nickel, iron, manganese, titanium, and silicon. An essential feature of the present invention is the co-presence in the electrode of titanium and silicon in controlled and critical amounts in combination with nickel, iron, manganese, and copper. The primary function of the titanium is to promote soundness in the weld metal, and the function of the silicon is to improve the physical properties of the weld metal. The novel welding electrode made in accordance with the present invention is capable of use in inert gas-shielded arc-welding operations either as a consumable electrode or as a welding rod used in conjunction with a non-consumable electrode such as a tungsten electrode. The broad and preferred ranges of the ingredients of the electrode composition of the present invention together with a preferred example thereof are given in Table I.

TABLE I.—ELECTRODE COMPOSITION

| Elements | Percent by Weight | | |
|---|---|---|---|
| | Broad Range | Preferred Range | Preferred Example |
| Nickel | 5 –15 | 9 –11 | 10 |
| Iron | 0.1 – 2 | 1 – 1.75 | 1.5 |
| Manganese | 0.1 – 1 | 0.25– 0.75 | 0.4 |
| Silicon | 0.05– 0.5 | 0.2 – 0.40 | 0.3 |
| Titanium | 0.02– 0.5 | 0.05– 0.15 | 0.1 |

The balance of the welding electrode or rod composition of Table I is copper, except for small amounts of other elements as noted hereinafter which may be present in the balance with copper in commercial practice. The aforementioned copper content of the welding electrode or rod composition is about 80.4% to 94.7% in the broad range, about 85.3% to 89.5% in the preferred range, and about 87.4% in the preferred example.

Magnesium, while not necessary for satisfactory welding response, should be included in the welding electrode or rod composition where melting conditions and production of the core wire point to a possibility of sulfur contamination, since magnesium tends to obviate the effects of sulfur. Magnesium in combination with the aforementioned essential ingredients also improves hot malleability and hot working operations. The magnesium may be included for the aforementioned purposes in small amounts up to about 0.08%, preferably from about 0.03% to about 0.05%.

Contaminants such as sulfur and lead are desirably kept low. Other so-called tramp elements (phosphorus, selenium, bismuth) must be absent or kept low. The total amounts of any other metals (zinc, cobalt, etc.) should be not more than about 0.5%.

The welding electrode or rod composition provided by the present invention is characterized by being capable of producing weld metal deposits substantially matching the composition of iron-bearing 90–10 type copper-nickel alloy material when the electrode or weld rod composition is used in welding the aforementioned copper-nickel material by either the non-consumable (e. g., tungsten) or the consumable electrode variations of the inert gas-shielded arc-welding process. The welding rod or electrode composition provided by the present invention is further characterized by the fact that due to its use the aforementioned resultant weld metal deposits are virtually porosity free, have attractive strength properties and good ductility, and are free from hot cracking.

Inasmuch as during the welding process recovery of certain of the alloy additions is less than 100%, the weld metal will differ in composition from the welding rod or electrode. Using the compositions of Table I the following variations in the composition of the copper-base weld metal deposit are generally obtained.

TABLE II—WELD METAL COMPOSITION

| Elements | Percent by Weight | |
|---|---|---|
| | Broad Range Corresponding to Broad Range of Table I | Preferred Range Corresponding to Preferred Range of Table I |
| Nickel | 5 to 15 | 9 to 11 |
| Iron | 0.1 to 2 | 1 to 1.75 |
| Manganese | 0.09 to 0.85 | 0.2 to 0.65 |
| Silicon | 0.04 to 0.4 | 0.15 to 0.35 |
| Titanium | 0.01 to 0.3 | 0.03 to 0.08 |

The balance of the weld metal composition of Table II is copper, except for small amounts of the other incidental elements which may be present in the balance with copper in commercial practice due to their presence in the welding electrode or rod as mentioned herein. The aforementioned copper content of the weld metal composition is about 80.8% to 94.75% in the broad range and about 85.5% to 89.6% in the preferred range.

The alloy can be prepared and the welding electrode or rod can be made therefrom by any conventional alloying and manufacturing procedures such as are well known in the art.

The critical alloying elements from the welding rod or electrode viewpoint are the titanium and the silicon in combination with nickel, iron, manganese, and copper. The presence of titanium in the combination is important for the elimination of gas porosity. The titanium also has a strengthening effect on the weld metal but the amounts needed for an attractive increment in tensile strength yield a weld that is sensitive to hot cracking. Very little titanium in the composition is required to eliminate weld porosity. A level of about 0.02%–0.03% residual titanium in the weld (0.075% titanium in the consumable electrode or welding rod) has a marked beneficial effect. At levels above about 0.30% residual titanium in the weld, the weld becomes prohibitively hot short under practically all welding conditions, with indications of hot shortness in evidence at titanium levels of the order of 0.20% under conditions of severe restraint. A range of 0.05% to 0.15% titanium in the welding electrode or rod is preferred, the lower preferred limit of 0.05% providing a useful working margin above the minimum absolutely necessary and the 0.15% upper preferred limit being well below the dangerous level at which weld hot cracking may take place.

Silicon substantially in excess of about 0.40% in the weld can produce weld hot cracking, and a maximum must also be observed for this element. Silicon is not effective by itself in eliminating porosity in inert gas-shielded arc welds. However, with the co-presence of a small amount of titanium in the weld (within the titanium ranges of Table II) to eliminate porosity, advantage can be taken of the strengthening effect of silicon.

It was found that when titanium and silicon are co-present, the amount of titanium necessary to eliminate gas porosity and the amount of silicon required to promote strength properties to the desired degree are both well below the amounts of these elements which lead to weld hot cracking.

It has been found that lead and silicon act synergistically to produce hot cracking in copper-base alloys. As a result of tests, applicants have established that if the 0.05% maximum permissible lead level that is now recognized in 90–10 type copper-nickel base metal specifications must, for manufacturing reasons, be carried into welding rod specifications, not more than about 0.15% silicon can safely be added to 90–10 type copper-nickel weld metal. If the lead can be held to a maximum of 0.02%, the silicon content in the weld can be doubled with modest improvements in the strength properties due to the presence of the additional silicon. At 0.01% lead, the silicon content can be up to about 0.35%. It has now been discovered that a definite lead-silicon relationship exists in which the permissible amount of lead contamination varies inversely with the silicon content of the weld. The relationship may be approximately expressed by the equation Maximum percent Pb in weld =
$$0.08 - 0.2 \times \text{percent Si in weld}$$

For the purpose of giving those skilled in the art a better understanding of the invention and a better appreciation of the advantages of the invention, the following illustrative examples are given:

*Example I.—Manual inert gas-shielded tungsten arc welding of plate*

Butt welds were made on ¼-inch iron-bearing 90–10 type copper-nickel plate, using helium as the inert shielding-gas in conjunction with a manual, inert gas, tungsten electrode, arc-welding torch, using a gas flow of about 30 C. F. H. (cubic feet per hour) and a direct current of about 190 amperes. The copper-nickel welding rods employed and the plate material welded, together with the resultant weld metal had the approximate analyses set forth in Table III.

TABLE III.—COMPOSITIONS

| Element | Percent by Weight | | | | |
|---|---|---|---|---|---|
| | Plate | Rod No. A | | Rod No. B | |
| | | Rod | Weld | Rod | Weld |
| Nickel | 10.1 | 10.5 | 10.5 | 10.4 | 10.4 |
| Iron | 1.5 | 1.5 | 1.5 | 1.5 | 1.6 |
| Manganese | 0.5 | 0.35 | 0.3 | 0.35 | 0.3 |
| Silicon | 0.006 | 0.35 | 0.33 | 0.35 | 0.3 |
| Titanium | | 0.075 | 0.03 | 0.12 | 0.04 |
| Magnesium | 0.05 | 0.03 | 0.02 | 0.04 | 0.02 |
| Copper | Bal. | Bal. | Bal. | Bal. | Bal. |

Transverse tensile test specimens were cut from the butt joint in the ¼-inch welded plate. These specimens were tested to determine the tensile strength and 0.2% offset yield strength of the welded material. In addition, transverse bend test specimens were also cut from the butt joint in the ¼-inch welded plate. These transverse bend test specimens were then bent in a jig to a U shape with the weld face in tension. Upon removal from the jig the convex surface was examined for the appearance of cracks or other open defects. The results of this test are reported in the column headed "180° guided U-bend test." After completion of the guided bend test, the bend specimens were then flattened to failure as free bend specimens and elongation was measured across the weld. A complete description of these bend tests and illustrations of the test specimens may be found in the American Welding Society publication "Welding Handbook," 3rd edition, 1950, pages 1450 to 1459, inclusive. Tests were also conducted on similar butt welds made with argon as the shielding gas using a gas flow of about 20 C. F. H. and a direct current of about 190 amperes. The results of the foregoing tests are given in Table IV.

TABLE IV

| Weld No. | Wire No. | Shielding Gas | Yield strength, p. s. i. (0.2% offset) | Tensile strength, p. s. i. | Transverse Bend Tests | |
|---|---|---|---|---|---|---|
| | | | | | 180° Guided U-bend Test | Free Bend Elongation, Percent |
| 1 | A | Helium | 23,200 | 46,700 | satisfactory | 61 |
| 2 | B | ---do--- | 24,400 | 45,300 | ---do--- | 55 |
| 3 | A | Argon | 24,600 | 45,500 | ---do--- | 70 |
| 4 | B | ---do--- | 24,900 | 45,700 | ---do--- | 72 |

All of these joints were radiographically acceptable. The welds Nos. 1 and 2 made under helium were slightly superior to those under argon in this respect.

*Example II.—Inert gas-shielded tungsten arc welding of 2-inch tubing*

The inert gas-shielded tungsten arc process has been used successfully to butt weld 2-inch iron-pipe-size 90–10 type copper-nickel tubing (of the same composition as the plate metal of Example I and having a wall thickness of 0.062 inch) and is preferred over other fusion welding methods. This tubing was welded in a single pass with the axis of the tubing in a horizontal position. The joint was not rotated. The outer surface of the tubing was slightly chamfered and the contiguous ends held together by four tack welds with no root space. The tubing was then welded using a 1/16-inch thoriated tungsten electrode, a 1/8-inch diameter welding rod within the preferred ranges of Table I (with about 0.35% silicon and about 0.08% titanium), 14 C. F. H. argon, and a direct current of 60 ampere straight polarity. Argon was preferred to helium in this instance because of the better arc control. A 1/8-inch welding rod diameter was chosen. The weld quality of joints made under the above conditions was fair to good. It was found that as the wall thickness of the tubing was increased, the welding operation was more readily accomplished.

*Example III.—Semi-automatic welding of plate using consumable electrode*

Butt welds were made on ⅜-inch plate under the following conditions using consumable electrodes of the same compositions as the welding rods used in Example I:

| | |
|---|---|
| Shielding gas | Argon 50 C. F. H. |
| Electrode diameter | 0.045 inch. |
| Wire feed | 300 in./min. |
| Welding current | 200 amps. D. C., reverse polarity. |
| Plate metal composition | Same as in Example I. |

Analyses of the weld metal in the resultant welds were as follows:

WELD METAL

| Element | Using Electrode No. A | Using Electrode No. B |
|---|---|---|
| Percent Nickel | 10.5 | 10.3 |
| Percent Iron | 1.5 | 1.6 |
| Percent Manganese | 0.3 | 0.3 |
| Percent Silicon | 0.31 | 0.34 |
| Percent Titanium | 0.05 | 0.08 |
| Percent Magnesium | 0.02 | 0.02 |

Tests were conducted on these welds similar to the tests conducted in Example I. The results of these tests are given in Table V.

TABLE V

| Weld No. | Electrode No. | Yield Strength, p. s. i. (0.2% offset) | Tensile Strength, p. s. i. | Transverse Bend Tests | |
|---|---|---|---|---|---|
| | | | | U-Bend test, 180° | Free Bend Elongation, percent |
| 5 | A | 27,100 | ¹ 48,900 | satisfactory | 38–43 |
| 6 | B | 26,000 | ¹ 48,600 | ---do--- | 42–46 |

¹ 100% joint efficiency—broke in the plate and not in the weld.

Radiographs of both joints showed almost complete freedom from porosity. Helium was less preferred with respect to arc stability and argon was therefore used in welding iron-bearing 90–10 type copper-nickel alloys by the consumable electrode variation of the inert gas-shielded arc welding process.

*Example IV*

Tests have developed the following relation between silicon in the iron-bearing 90–10 type copper-nickel weld and hot cracking, using the X-weld crack test. This is a quite simple test which is effective in detecting weld hot cracking tendencies. Generally speaking, electrodes which meet this test can be used for welding of heavy plate under severe restraint without encountering weld hot cracking. In making the test, two 1-inch square by 3-inch long bars are clamped with their edges together to form an X-joint. Passes are laid in, two at a time, on alternate sides of the joint, allowing the specimen to cool to about 100° F. between passes. The specimen is clamped for the early part of the test and is subsequently left unclamped for the balance of the test. During welding, each pass is examined visually and on completion of welding, two cross sections about ⅝" to ¾" from each end are polished and etched and examined for cracks. A complete description of the test, and illustrations of the test specimen, may be found in the Welding Journal, vol. 24, pages 769–S to 775–S (November 1946). A series of X-weld crack test specimens were prepared and tested, according to the procedure outlined above, from 1-inch by 1-inch by 3-inch iron-bearing 90–10 type copper-nickel test blocks (of an approximate composition the same as the plate of Example I) with the weld metal silicon content being varied as indicated in the following table which sets forth the amount of silicon in the weld and the amount of cracking noted for the various silicon contents.

| Weld No. | Silicon in Weld,¹ percent | Cracking |
|---|---|---|
| 7 | 0.08 | None. |
| 8 | 0.16 | Do. |
| 9 | 0.29 | Do. |
| 10 | 0.42 | Slight cracking. |
| 11 | 0.51 | Do. |

¹ With less than 0.01% lead present in the welds.

These results confirm that as the silicon is increased beyond the 0.40% of Table II (even with lead adequately controlled at not more than 0.01%), the welds tend to become hot short or to crack. In inert gas-shielded arc welding, silicon recoveries in the weld metal are of the order of 80% to 90%. The silicon contents of welding rods according to this invention are therefore 110% to 125% higher than the silicon contents of the corresponding weld metal deposits.

*Example V*

Data were acquired to develop the relationship between titanium content of the weld and weld hot cracking. The following data are based on X-weld crack tests made on iron-bearing 90–10 type copper-nickel test blocks (of an approximate composition the same as the plate of Example I). The test welds were made under conditions of severe restraint according to the procedure outlined in Example IV with the inert gas, tungsten electrode, arc process.

| Weld No. | Titanium In Welding Rod, percent | Titanium in Weld, percent | Cracking In Weld |
| --- | --- | --- | --- |
| 12 | 0.09 | 0.042 | None. |
| 13 | 0.18 | 0.056 | Do. |
| 14 | 0.25 | 0.13 | Do. |
| 15 | 0.31 | 0.16 | Do. |
| 16 | 0.58 | 0.19 | 2 cracks. |

However, it may be observed that under more favorable conditions of low or moderate stress or restraint, uncracked inert gas-shielded arc welds have been obtained with up to 0.3% residual titanium in the weld metal.

The present invention is particularly applicable to the inert gas-shielded electric arc welding of cupro-nickel alloys containing about 5% to 15% nickel and is suitable for such welding when using either the consumable electrode variation or the non-consumable electrode variation of the inert gas-shielded arc-welding process. The present invention is suitable for the welding of a wide variety of articles or parts, whether they be made from plate, sheet, tubes, etc. The present invention is of wide application for producing substantially pore-free weld deposits on iron-bearing 90–10 type cupro-nickel alloy material especially where it is desired to obtain a weld deposit substantially matching the material welded in composition. The present invention is of particular utility in the shipbuilding industry, e. g., for the construction of condensers and piping. It is also useful in other fields where resistance is required to the destructive action of salt water particularly to the action of rapidly moving salt water.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. The method of arc welding iron-bearing 90–10 type cupro-nickel parts which comprises disposing the parts to be united in welding position, directing an electric arc progressively along the seam, shielding the arc and the junction of the seam being welded with a substantially pure inert gas, and supplying metal from a bare metal welding rod to the arc sufficient to approximately fill the weld space, said bare metal welding rod comprising an alloy containing about 5% to 15% nickel, about 0.1% to 2% iron, about 0.1% to 1% manganese, about 0.05% to 0.5% silicon, about 0.02% to 0.5% titanium, and the balance essentially copper.

2. The method of arc welding iron-bearing 90–10 type cupro-nickel parts which comprises disposing the parts to be united in welding position, directing an electric arc progressively along the seam, shielding the arc and the junction of the seam being welded with a substantially pure inert gas, and supplying metal from a bare metal welding rod to the arc sufficient to approximately fill the weld space, said bare metal welding rod comprising an alloy containing about 9% to 11% nickel, about 1% to 1.75% iron, about 0.25% to 0.75% manganese, about 0.2% to 0.40% silicon, about 0.05% to 0.15% titanium, and the balance essentially copper.

3. The method of arc welding iron-bearing 90–10 type cupro-nickel members which comprises disposing the members to be united in welding position, directing an electric arc progressively along the seam, shielding the arc and the junction of the seam being welded with a substantially pure inert gas, and supplying metal from a bare metal welding rod to the arc sufficient to approximately fill the weld space, said bare metal welding rod comprising an alloy containing about 10% nickel, about 1.5% iron, about 0.4% manganese, about 0.3% silicon, about 0.1% titanium, and the balance essentially copper.

4. The method of arc welding iron-bearing 90–10 type cupro-nickel members which comprises disposing the members to be united in welding position, directing an electric arc progressively along the seam, shielding the arc and the junction of the seam being welded with a substantially pure inert gas, and supplying metal from a bare metal welding rod to the arc sufficient to approximately fill the weld space, said bare metal welding rod comprising an alloy containing about 5% to 15% nickel, about 0.1% to 2% iron, about 0.1% to 1% manganese, about 0.05% to 0.5% silicon, about 0.02% to 0.5% titanium, and the balance essentially copper and the composition of said metal being controlled so that any lead contamination in the resultant weld metal does not exceed the amount expressed by the equation $$\text{Maximum percent Pb in weld} = 0.08 - 0.2 \times \text{percent Si in weld}$$

whereby the weld is free from hot cracking.

5. As an article of manufacture for the use in the inert gas-shielded arc welding of iron-bearing copper-nickel parts, a welding rod composed of an alloy having as essential ingredients at least about 80.4% copper, about 5% to 15% nickel, about 0.1% to 2.0% iron, about 0.1% to 1% manganese, about 0.05% to 0.5% silicon and about 0.02% to 0.5% titanium, the composition of the aforementioned welding rod being controlled so that any lead contamination in the resultant weld metal does not exceed the amount expressed by the equation $$\text{Maximum percent lead in weld} = 0.08 - 0.2 \times \text{percent silicon in weld}$$

whereby the weld is free from hot cracking.

6. A welding rod for the inert gas-shielded arc welding of iron-bearing copper-nickel members, said welding rod being composed of an alloy containing about 5% to 15% nickel, about 0.1% to 2.0% iron, about 0.1% to 1% manganese, about 0.05% to 0.5% silicon, about 0.02% to 0.5% titanium, and the balance essentially copper.

7. As an article of manufacture for use in the inert gas-shielded arc welding of iron-bearing copper-nickel parts, an electrode composed of an alloy comprising about 9% to 11% nickel, about 1% to 1.75% iron, about 0.25% to 0.75% manganese, about 0.2% to 0.40% silicon, about 0.05% to 0.15% titanium, and the balance essentially copper.

8. As an article of manufacture for use in the inert gas-shielded arc welding of iron-bearing copper-nickel parts, an electrode composed of an alloy comprising about 10% nickel, about 1.5% iron, about 0.4% manganese, about 0.3% silicon, about 0.1% titanium, and the balance essentially copper.

9. A weld deposit on iron-bearing cupro-nickel alloy material comprising inert gas-shielded arc weld deposited metal consisting of about 5% to 15% nickel, about 0.1% to 2% iron, about 0.09% to 0.85% manganese, about 0.04% to 0.4% silicon, about 0.01% to 0.3% titanium, and the balance essentially copper, characterized by being substantially free from porosity and being sound, strong and ductile.

10. A weld deposit on iron-bearing cupro-nickel alloy material comprising inert gas-shielded arc weld deposited metal consisting of about 9% to 11% nickel, about 1% to 1.75% iron, about 0.20% to 0.65% manganese, about 0.15% to 0.35% silicon, about 0.03% to 0.08% titanium, and the balance essentially copper, characterized by being substantially free from porosity and being sound, strong and ductile.

11. As an article of manufacture, a welded structure comprising at least two iron-bearing 90–10 type copper-nickel members joined together by at least one inert gas-shielded arc weld metal deposit, said weld metal deposit being composed of an alloy containing about 5% to 15% nickel, up to about 2% iron, about 0.09% to 0.85% manganese, about 0.04% to 0.4% silicon, about 0.01% to 0.3% titanium, and the balance essentially copper.

12. As an article of manufacture, a welded structure comprising at least two iron-bearing 90–10 type copper-nickel members joined together by at least one inert gas-shielded arc weld metal deposit, said weld metal deposit being composed of an alloy containing about 9% to 11% nickel, about 1% to 1.75% iron, about 0.20% to 0.65% manganese, about 0.15% to 0.35% silicon, about 0.03% to 0.08% titanium, and the balance essentially copper.

13. As an article of manufacture, a welded structure comprising at least two iron-bearing 90–10 type copper-nickel members joined together by at least one inert gas-shielded arc weld metal deposit, said weld metal deposit being composed of an alloy containing about 5% to 15% nickel, up to about 2% iron, about 0.09% to 0.85% manganese, about 0.04% to 0.4% silicon, about 0.01% to 0.3% titanium, and the balance essentially copper, with any lead contamination in the weld metal deposit not exceeding the amount expressed by the equation Maximum percent lead in weld = $0.08 - 0.2 \times$ percent silicon in weld whereby the weld is free from hot cracking.

14. A method of arc welding comprising establishing an electric arc between a metal workpiece made of an iron-bearing cupro-nickel alloy and a bare consumable electrode made of an alloy containing about 5% to 15% nickel, about 0.1% to 2% iron, about 0.1% to 1% manganese, about 0.05% to 0.5% silicon, about 0.02% to 0.5% titanium, and the balance essentially copper, to provide a welding puddle; blanketing said arc, the end of said consumable electrode, and the welding puddle with a stream of inert monatomic shielding gas; and advancing the bare consumable electrode to maintain the arc as metal is transferred from the electrode to the workpiece to form a weld which is strong, ductile and substantially free from porosity.

15. A method of arc welding comprising establishing an electric arc between a metal workpiece made of an iron-bearing cupro-nickel alloy and a bare non-consumable electrode to provide a welding puddle; feeding a welding rod made of an alloy containing about 9% to 11% nickel, about 1% to 1.75% iron, about 0.25% to 0.75% manganese, about 0.2% to 0.4% silicon, about 0.05% to 0.15% titanium, and the balance essentially copper to the weld puddle; blanketing said arc, the end of said non-consumable electrode, the end of said welding rod, and the welding puddle with a stream of inert gas selected from the group consisting of argon, helium and mixtures thereof; and advancing the bare non-consumable electrode and the consumable welding rod to maintain the arc as metal is transferred from the consumable welding rod to the workpiece to form a weld which is strong, ductile and substantially free from porosity.

References Cited in the file of this patent

UNITED STATES PATENTS

| | | |
|---|---|---|
| 967,579 | Siemund | Aug. 16, 1910 |
| 1,502,789 | Lincoln | July 24, 1924 |
| 2,074,604 | Bolton | Mar. 23, 1937 |
| 2,123,571 | Lessel | July 12, 1938 |
| 2,269,581 | Crampton | Jan. 13, 1942 |
| 2,496,347 | Herbst | Feb. 7, 1950 |
| 2,583,163 | Wasserman | Jan. 22, 1952 |
| 2,608,753 | Mooradian | Sept. 2, 1952 |

FOREIGN PATENTS

| | | |
|---|---|---|
| 259,967 | Great Britain | Aug. 18, 1927 |